(12) United States Patent
Hormati

(10) Patent No.: US 9,083,576 B1
(45) Date of Patent: Jul. 14, 2015

(54) METHODS AND SYSTEMS FOR ERROR DETECTION AND CORRECTION USING VECTOR SIGNAL PREDICTION

(71) Applicant: Kandou Labs SA, Lausanne (CH)

(72) Inventor: Ali Hormati, Chemin des Berges (CH)

(73) Assignee: KANDOU LABS, S.A. (CH)

( * ) Notice: Subject to any disclaimer, the term of this patent is extended or adjusted under 35 U.S.C. 154(b) by 14 days.

(21) Appl. No.: 13/840,933

(22) Filed: Mar. 15, 2013

(51) Int. Cl.
    *H04L 25/03* (2006.01)

(52) U.S. Cl.
    CPC ............... *H04L 25/03019* (2013.01)

(58) Field of Classification Search
    CPC .................................. H04L 25/03019
    USPC ........ 375/E7.209, 233, 240.22, 254, 346, 348
    See application file for complete search history.

(56) References Cited

U.S. PATENT DOCUMENTS

| | | | |
|---|---|---|---|
| 4,486,739 A | 12/1984 | Franaszek et al. | |
| 5,166,956 A | 11/1992 | Baltus et al. | |
| 5,412,689 A | 5/1995 | Chan et al. | |
| 5,511,119 A | 4/1996 | Lechleider | |
| 5,553,097 A | 9/1996 | Dagher | |
| 5,825,808 A | 10/1998 | Hershey et al. | |
| 5,995,016 A | 11/1999 | Perino | |
| 6,005,895 A | 12/1999 | Perino et al. | |
| 6,359,931 B1 | 3/2002 | Perino et al. | |
| 6,404,820 B1 | 6/2002 | Postol | |
| 6,504,875 B2 | 1/2003 | Perino et al. | |
| 6,556,628 B1 | 4/2003 | Poulton et al. | |
| 6,621,427 B2 | 9/2003 | Greenstreet | |
| 6,650,638 B1 | 11/2003 | Walker et al. | |
| 6,661,355 B2 | 12/2003 | Cornelius et al. | |
| 6,766,342 B2 | 7/2004 | Kechriotis | |
| 6,839,429 B1 | 1/2005 | Gaikwad et al. | |
| 6,999,516 B1 | 2/2006 | Rajan | |
| 7,167,019 B2 | 1/2007 | Broyde et al. | |
| 7,180,949 B2 | 2/2007 | Kleveland et al. | |
| 7,184,483 B2 | 2/2007 | Rajan | |
| 7,358,869 B1 | 4/2008 | Chiarulli et al. | |
| 7,362,130 B2 | 4/2008 | Broyde et al. | |

(Continued)

FOREIGN PATENT DOCUMENTS

WO    WO 2010031824    *    3/2010

OTHER PUBLICATIONS

"Delayed Decision-Feedback Sequence Estimation" IEEE Transactions on Communications, vol. 37 No. 5, May 1989.

(Continued)

*Primary Examiner* — Sophia Vlahos
(74) *Attorney, Agent, or Firm* — Invention Mine LLC

(57) ABSTRACT

Decision Feedback Equalization techniques are difficult to apply in high speed communications systems, as the decoding process for a received symbol may not be completed in time to allow adaptive detection of the following symbol. Advantage may be taken of certain novel aspects of vector signaling codes to provide decision feedback to an adaptive data receiver concurrent with symbol decoding, rather than being delayed to symbol decode completion. Methods and systems are described that error correct an initial non-adaptive decoding, based on differences between the actual received signals and simulated received signals derived from the initial decoding and historical received data. Additional methods and systems are described using bounding functions to estimate an error rate with reduced computation.

10 Claims, 4 Drawing Sheets

(56) References Cited

U.S. PATENT DOCUMENTS

| | | | |
|---|---|---|---|
| 7,633,850 B2 | 12/2009 | Ahn et al. | |
| 7,656,321 B2 | 2/2010 | Wang | |
| 7,706,524 B2 | 4/2010 | Zerbe | |
| 7,746,764 B2 | 6/2010 | Rawlins et al. | |
| 7,764,931 B2 | 7/2010 | Kim et al. | |
| 7,882,413 B2 | 2/2011 | Chen et al. | |
| 7,933,770 B2 | 4/2011 | Kruger et al. | |
| 8,055,095 B2 | 11/2011 | Palotai et al. | |
| 8,505,332 B1 | 11/2011 | Chung et al. | |
| 8,091,006 B2 | 1/2012 | Prasad et al. | |
| 8,116,366 B2 | 2/2012 | Kawashima et al. | |
| 8,159,375 B2 | 4/2012 | Abbasfar | |
| 8,159,376 B2 | 4/2012 | Abbasfar | |
| 8,279,094 B2 | 10/2012 | Abbasfar | |
| 8,365,035 B2 | 1/2013 | Hara | |
| 8,442,210 B2 | 5/2013 | Zerbe | |
| 8,443,223 B2 | 5/2013 | Abbasfar | |
| 8,462,891 B2 | 6/2013 | Kizer et al. | |
| 8,520,493 B2 | 8/2013 | Goulahsen | |
| 8,539,318 B2 | 9/2013 | Cronie et al. | |
| 8,588,280 B2 | 11/2013 | Oh et al. | |
| 8,469,460 B2 | 2/2014 | Ware et al. | |
| 8,649,445 B2 | 2/2014 | Cronie | |
| 8,718,184 B1 | 5/2014 | Cronie | |
| 2003/0128656 A1* | 7/2003 | Scarpa | 370/203 |
| 2007/0283210 A1 | 12/2007 | Prasad et al. | |
| 2008/0273480 A1* | 11/2008 | Chang | 370/311 |
| 2010/0180143 A1 | 7/2010 | Ware et al. | |
| 2011/0268225 A1 | 11/2011 | Cronie et al. | |
| 2011/0299555 A1 | 12/2011 | Cronie et al. | |
| 2013/0051162 A1 | 2/2013 | Amirkhany et al. | |
| 2013/0077669 A1* | 3/2013 | Malipatil et al. | 375/233 |

OTHER PUBLICATIONS

"Pipelined Adaptive DFE Architectures" Naresh R. Shanbhag and Keshab K. Parhi, SPIE vol. 2027, pp. 134-145, 1993.

Abbasfar, A. "Generalized Differential Vector Signaling," IEEE International Conference on Communications, ICC '09, (Jun. 14, 2009), pp. 1-5.

Dasilva, et al., "Multicarrier Orthogonal CDMA Signals for Quasi-Synchronous Communication Systems," IEEE Journal on Selected Areas in Communications, vol. 12, No. 5 (Jun. 1, 1994), pp. 842-852.

Slepian, D., "Permutation Modulation"; 1965, Proceedings of the IEEE, vol. 53, No. 3, pp. 228-236.

Stan, M. et al.; "Bus-Invert Coding for Low-power I/O"; 1995, IEEE Transactions on VLSI systems, vol. 3, No. 1, pp. 49-50.

Tallini, L., et al.; "Transmission Time Analysis for the Parallel Asynchronous Communication Scheme"; 2003, IEEE Transactions on Computers, vol. 52, No. 5, pp. 558-571.

Wang et al., "Applying CDMA Technique to Network-on-Chip," IEEE Transactions on Very Large Scale Integration (VLSI) Systems, vol. 15, No. 10 (Oct. 1, 2007), pp. 1091-1100.

* cited by examiner

METHODS AND SYSTEMS FOR ERROR DETECTION AND CORRECTION USING VECTOR SIGNAL PREDICTION

CROSS REFERENCES

The following references are herein incorporated by reference in their entirety for all purposes:

U.S. Patent Publication 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III"); and U.S. patent application Ser. No. 13/463,742, filed May 3, 2012, naming Harm Cronie and Amin Shokrollahi, entitled "Finite State Encoders and Decoders for Vector Signaling Codes" (hereafter called "Cronie IV").

BACKGROUND

In communication systems, information may be transmitted from one physical location to another. Furthermore, it is typically desirable that the transport of this information is reliable, is fast and consumes a minimal amount of resources. One of the most common information transfer mediums is the serial communications link, which may be based on a single wire circuit relative to ground or other common reference, multiple such circuits relative to ground or other common reference, or multiple circuits used in relation to each other. An example of the latter utilizes differential signaling (DS). Differential signaling operates by sending a signal on one wire and the opposite of that signal on a paired wire; the signal information is represented by the difference between the wires rather than their absolute values relative to ground or other fixed reference.

Differential signaling enhances the recoverability of the original signal at the receiver over single ended signaling (SES), by cancelling crosstalk and other common-mode noise, but a side benefit of the technique is that the Simultaneous Switching Noise (SSN) transients generated by the two signals together is nearly zero; if both outputs are presented with an identical load, the transmit demand on its power supply will be constant, regardless of the data being sent. Any induced currents produced by terminating the differential lines in the receiver will similarly cancel out, minimizing noise induction into the receiving system.

There are a number of signaling methods that maintain the desirable properties of DS while increasing pin efficiency over DS. Many of these attempts operate on more than two wires simultaneously, using binary signals on each wire, but mapping information in groups of bits. For example, a communication system may, for some k>1, map each k information bits of the set $\{0,1\}k$ to a set C comprising 2k code words. Each code word may have the same length and if that length is less than 2k, the pin efficiency would be greater than 0.5. For example, each component may be conveyed on one of N wires and have coordinates belonging to a set $\{a, -a\}$ so that each of the N wires carries a binary signal. For simple "repetitive" DS, the DS signals are applied independently to pairs of wires, so number of wires (N) would be 2k. This mapping (with N<2k) can provide higher pin efficiency relative to DS. Also, unlike "repetitive" SES, the set C does not contain all possible vectors of the given length.

Vector signaling is a method of signaling. With vector signaling, a plurality of signals on a plurality of wires is considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of exactly the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. Stated mathematically, binary vector signaling maps the information bits of the set $\{0,1\}k$ for some k>1 to a code, C, comprising 2k vectors. Each vector may have the same dimension, N, and that dimension (i.e., number of components) may be greater than k but less than 2k (resulting in a the pin efficiency above 0.5). A "binary vector signaling code" refers to a mapping and/or set of rules to map information bits to binary vectors.

With non-binary vector signaling, each component has a coordinate value that is a selection from a set of more than two possible values. A "non-binary vector signaling code" refers to a mapping and/or set of rules to map information bits to non-binary vectors. Stated mathematically, given an input word size, k>1, given a finite set, S, called the alphabet, of three or more values (possibly corresponding to, or representable by, values that may correspond to physical quantities as explained herein, wherein the values are typically real numbers), and given a vector dimensionality, N, non-binary vector signaling is a mapping between $\{0,1\}k$ and a vector set, C, where C is a subset of SN. In specific instances, there is no proper subset T of S such that C is a subset of TN, i.e., over the code C, there is at least one component (coordinate position) in which each of the values of finite set S appears. In this case, S may be called the "true alphabet" of the code. For S being a finite set of three values, that means that there will be at least one coordinate position for which at least three code words all have different values. Any suitable subset of a vector signaling code denotes a "subcode" of that code. Such a subcode may be a vector signaling code.

Some vector signaling methods are described in Cronie I, Cronie II, Cronie III, and Cronie IV. For example:

(1) Orthogonal differential vector signaling is described, wherein the code C is obtained as the Hadamard transform images of vectors of length k with coordinates in the set $\{+1, 1\}$;

(2) Permutation modulation codes are described, wherein the code C is obtained by taking the set of all vectors obtained from all permutations of a fixed vector; and (3) Sparse signaling codes are described, wherein the code C is the set of all vectors obtained from all permutations of a fixed vector in which many coordinates are zero (or a fixed number).

While non-binary vector signaling methods can provide substantial improvements regarding the tradeoff of pin efficiency, power efficiency and noise resilience as compared to traditional signaling methods, there are some applications wherein additional improvements are possible.

BRIEF SUMMARY

A digital communications system transports data from a data transmitter to a data receiver over a communications link that may be subject to induced noise and signal degradation. One source of such degradation can be residual interactions between previously transmitted data, the transmission medium, and currently-transmitted data, known as inter-symbol interference. A decision feedback equalizer (DFE) is a nonlinear equalizer that uses the results of a previous detector decision to eliminate inter-symbol interference on data currently being demodulated. It may be difficult or impossible to apply DFE methods in high speed communications systems, where the decoding process for a received symbol may not be completed in time to provide useful feedback to detection of the following symbol. Advantage may be taken of certain novel aspects of vector signaling codes to provide decision feedback to an adaptive data receiver concurrent with symbol decoding, rather than being delayed to symbol decode completion.

BRIEF DESCRIPTION OF THE DRAWINGS

Various embodiments in accordance with the present disclosure will be described with reference to the drawings. Same numbers are used throughout the disclosure and figures to reference like components and features.

DETAILED DESCRIPTION

Figure 1:
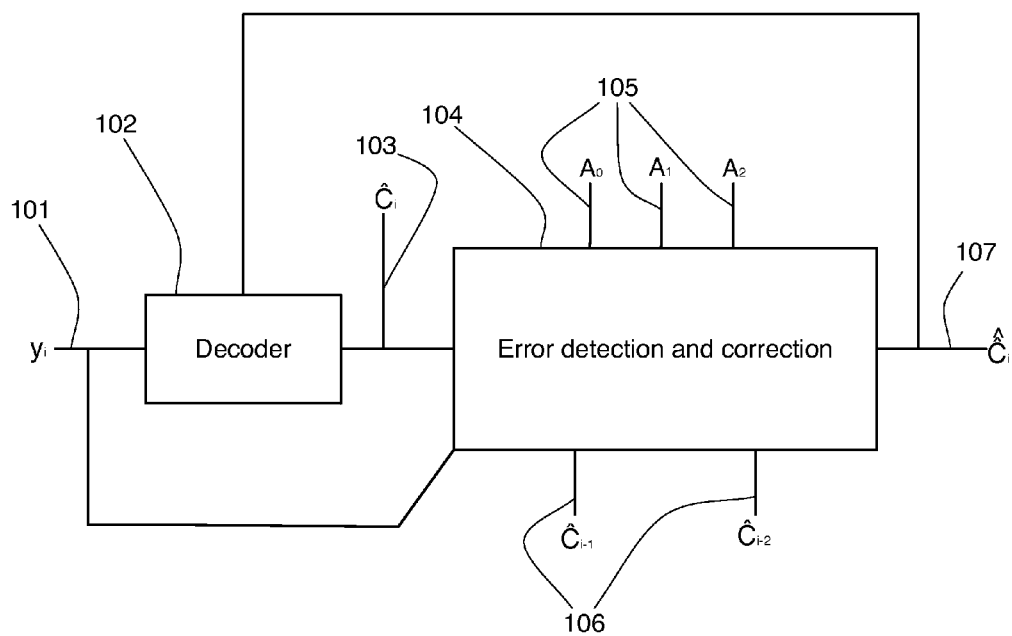
FIG. 1 is a block diagram for a data receiver in accordance with at least one embodiment of the invention.

Conventional data communication approaches have shortcomings recognized by the inventors. Data communications links are subject to induced noise, crosstalk, and signal attenuation, resulting in impaired receive signal/noise ratios that may ultimately result in data loss or corruption. At even moderately high speeds, data communications links must be modeled as transmission lines having distributed characteristics. The propagating signals of transmitted data interact with such characteristics, resulting in anomalous time-structured effects including pulse delay, edge smear, and signal reflections. The result of such interactions is that the received signals associated with a given data bit may be modulated by the residual effects of previously-transmitted data signals, an effect called inter-symbol interference or ISI.

A decision feedback equalizer (DFE) is a nonlinear receive equalizer that uses previous detector decisions to eliminate the ISI on received signals that are currently being demodulated. In other words, distortion that would have been produced by previously received data is modeled and subtracted from the currently received signal prior to its demodulation, reducing or eliminating the effects of ISI.

This desirable DFE behavior may be difficult or impossible to obtain at higher data communications rates, where the detector decision for a given data bit may be obtained too late to allow its influence to be modeled and subtracted from the next arriving data bit. Such receive delay effects become more pronounced as the encoding method used for data transmission become more complex, often requiring pipelined or parallel-processing decoder architectures which provide increased decoder throughput at the cost of increased decoder latency.

Vector Signaling Codes

A vector signaling code encodes transmitted data as a vector; a set of symbols selected from a fixed alphabet and satisfying certain defined constraints. As examples, one vector signaling code may be comprised of eight binary bits, and another may be comprised of four ternary values. Constraints may include weight—the number of symbols allowed to take on other than a default or quiescent value, and balance—the additive sum of all symbols totaling to a selected constant such as zero.

For purposes of description and without limitation, a generic vector signaling code will hereafter be used that is composed of eight ternary symbols, each symbol chosen from an alphabet of $\{+, 0, -\}$. The constraints chosen for this code are that the code is balanced, all symbols of a valid codeword summing to 0; and sparse, every allowable permutation containing exactly four 0 symbols (thus, also constrained by the balance requirement to have exactly two + symbols and two − symbols.) One of moderate knowledge in the field will observe that there are 420 possible permutations or codewords in this example vector signaling code, which is sufficient to encode at least 8 binary bits of data. Thus, this particular code may be called 8b8w, as it can be used to encode eight bits into an eight symbol word.

As group coding of this kind is an essential element of multiwire communications circuits, it is common to think of the individual symbols of a vector as being communicated independently, as over discrete communications channels or wires, with the aggregate result of such multiple receptions being reconstructed into a single codeword for detection. However, there is nothing to preclude codeword symbols from being communicated sequentially over a single wire or channel, or indeed over any combination of discrete wires and sequential time intervals. For purposes of explanation and without limitation, it is presumed that codewords are communicated over a set of multiple wires in a single time interval, hereafter called the symbol interval.

Feedback-Based Receive Equalization and Detection

Conventional serial communications receivers make localized symbol decisions at the channel level, for example by comparing the received voltage measured on a wire with a fixed reference level, or with a variable reference level derived from past behavior on that wire, i.e. the average voltage level over a period of time spanning many bits. Thus, a measured signal level of +0.26 volts compared to a fixed reference of zero volts, or to a variable reference level of +0.08 volts corresponding to the average signal level over the last 8 bit times, would be interpreted as a "1" bit.

A conventional serial communications receiver incorporating DFE would subsequently incorporate that "1" bit decision into the next measured signal level interpretation on the same wire, either through modification of that wire receiver's frequency and gain characteristics, or by adjustment of the reference level used to make the next symbol interpretation. In this way the DFE receiver may compensate for the residual effects of that "1" bit's transmission over that wire, such as an increase in the average DC voltage level of the wire, slower transition time of a subsequent negative signal swing, etc.

Combining the example vector signaling code with the concept of decision feedback equalization of each communications channel, it is readily apparent that two distinct levels of decoding occur within the combined communications receiver. Measured signals levels are obtained from each communications channel at each symbol interval and are interpreted as an equivalent symbol of the vector signaling code. Then, the received symbols are combined to create a received codeword, which is decoded into received data.

Thus, at least two levels of constraints apply to signals in this receiver: For the current example, each of the eight individual channel signals must map to a member of the symbol alphabet {+, 0, −}. Second, the eight received symbols must map to a valid codeword of the vector signaling code, in this example summing to 0 and containing exactly four 0 symbols, two + symbols, and two − symbols. In some embodiments, further constraints may exist, for example disallowing some or all of the 420-256 codewords not needed to represent an 8 bit binary data value. A vector signaling code receiver incorporating the concept of maximum likelihood detection may adaptively select detection options that lead away from out-of-constraint conditions and to valid results, for example selecting the four channel signals closest to zero signal level as representing the four expected 0 symbols, the two most positive channel signals as representing the two expected + symbols, and the two most negative channel signals as representing the two expected − symbols.

Predictive Result Feedback

Decoder latency provides a significant difficulty in integrating the concepts of maximum likelihood codeword detection and DFE channel processing. Because of the complexity of decoding a codeword of a vector signaling code, definitive information as to which wire signals represent what symbols of a valid codeword may not be available for multiple symbol time intervals. As one example, four, eight, or more pipelined decoders may be required to process vector signaling codes transmitted over extremely high data rate circuits, resulting in decoded data availability many symbol time intervals too late to allow compensation for inter-symbol interference at the wire level. Thus, one component of an effective integration of vector signaling codes and DFE detection is the ability to unroll or parallelize processing that conventionally takes place within the feedback loop between vector decoding and symbol detection.

It is observed that under many conditions the uncorrected error rate of a channel data detector is low. In accordance with at least one embodiment of the invention shown as the block diagram of FIG. 1, received signal information 101 is decoded 102 without any DFE feedback, producing a tentative symbol result 103. This tentative symbol result is then error corrected 104 using previous input channel information 105 and previous symbol results 106 to produce corrected symbols 107. In some embodiments, the detected symbol with any necessary correction may be fed back to decoder 102 to facilitate reception of subsequent signals, as one example by adjustment of channel detection thresholds.

Assuming that the pre-cursor ISI (anticipatory Inter-Symbol Interference, or influence on the current symbol by the next symbol to be transmitted) has been taken care of using transmit-end pre-equalization, we may describe the receive data as:

$$y_i = A_0 c_i + A_1 c_{i-1} + A_2 c_{i-2} \quad [\text{Eqn. 1}]$$

at time $t = iT$ where the set $\{A_0, A_1, A_2\}$ are the vectors of values obtained from measurement of the input channels during the most recent and two previous symbol intervals, and $\{C_i, C_{i-1}, C_{i-2}\}$ are the current symbol and the two previous symbols sent on the line. Here, we have assumed for simplicity of description that the ISI and crosstalk come from the two previous symbols, although the method described is general and may be extended to include additional transmission history.

Denoting $\hat{C}_i$ as the decoder output for input $y_i$ we may simulate the channel behavior assuming the two previous symbols were correct as:

$$\hat{y}_i = A_0 \hat{c}_i + A_1 c_{i-1} + A_2 c_{i-2} \quad [\text{Eqn. 2}]$$

$$(y_i - \hat{y}_i) = A_0 (c_i - \hat{c}_i) \quad [\text{Eqn. 3}]$$

$$c_i = \hat{c}_i + A_0^{-1}(y_i - \hat{y}_i) \quad [\text{Eqn. 4}]$$

Thus, the quantity $A_0^{-1}(y_i - \hat{y}_i)$ is the possible correction term to be applied to the unequalized decoded symbol $\hat{C}_i$ with the magnitude of this correction indicating whether or not there is an error in the unequalized decoded symbol. In accordance with at least one embodiment of the invention, a threshold test is applied to each element of $A_0^{-1}(y_i - \hat{y}_i)$ such that exceeding the threshold indicates an error related to the corresponding element.

TABLE I example values for predictive symbol analysis

| Input wire | Ideal symbol | Received values | Predicted symbol | Simulated values | Difference of simulation from actual |
|---|---|---|---|---|---|
| a | 0.5 | 0.24 | 0 | −0.26 | 0.5 |
| b | 0.5 | 0.5 | 0.5 | 0.5 | 0 |
| c | 0 | 0.26 | 0.5 | 0.74 | −0.48 |
| d | 0 | 0 | 0 | 0 | 0 |
| e | 0 | 0 | 0 | 0 | 0 |
| f | 0 | −0.26 | −0.5 | −0.76 | 0.5 |
| g | −0.5 | −0.24 | 0 | 0.26 | −0.5 |
| h | −0.5 | −0.5 | −0.5 | −0.5 | 0 |

In accordance with at least one embodiment of the invention the numeric values of Table I provides a further example based on the previously described 8b8w encoding. As shown in the first column, eight wires identified as a-h are inputs to the receiver. The signal values shown in the second column represent ideal received signals for the example codeword (+, +, 0, 0, 0, 0, −, −) where a + symbol is represented by a positive 0.5 volt signal, a 0 symbol is represented by a zero volt signal, and a − symbol is represented by a −0.5 volt signal.

The values of the third column suggest what actual values might be received with no DFE compensation for that transmitted codeword. Based on those values, a first attempt at decoding produces the predicted symbols of column four. That is, a decoder applying the known set of constraints embodied in the vector signaling code will produce the predicted symbols of column four as representing the maximum likelihood codeword associated with the values of column three. Given those predicted symbols, the decoder may simulate a set of values as shown in column five that correspond to the predicted symbols and past symbols received. Column six shows the calculated differences between the actual received values of column three and the simulated values of column five. It is apparent that the difference values for wires a, c, f and g are significant, while the other values are small; if a threshold of, as an example, 0.1 was used as a limit on the allowable absolute magnitude of difference, wires a, c, f and g would be flagged as being in error, and an error correction operation seeking to find a different symbol mapping for those wires would be performed by, as examples, changing the predicted symbol elements of the flagged wires based on the sign of the error magnitude for those wires, or by summing the difference and the predicted symbol and decoding again based on finding the maximums and minimums including these summed values It should be noted that conventional DFE circuits operating on individual wires can not produce these results. Observing the values of column three, a naïve wire-by-wire detector might find those values represent three positive symbols, two zeroes, and three negative symbols. A different such analysis with higher detection thresholds might find one positive symbol, six zeroes, and one negative symbol. Neither of those results is compatible with the codeword constraints of the actual vector signaling code in use, and these violations of codeword constraints would not be corrected by changing individual channel behaviors using only feedback information from previous activity of the same channel. In contrast, the described method's decoding to a valid codeword, and then simulation from that codeword back to hypothetical signal information which in turn leads to error identification, effectively spreads information relevant to accurate detection between channels. Thus, it is possible that a given channel's detection characteristics may be influenced not only by past behavior of that channel alone, but by the receive history across all channels.

Figure 2:
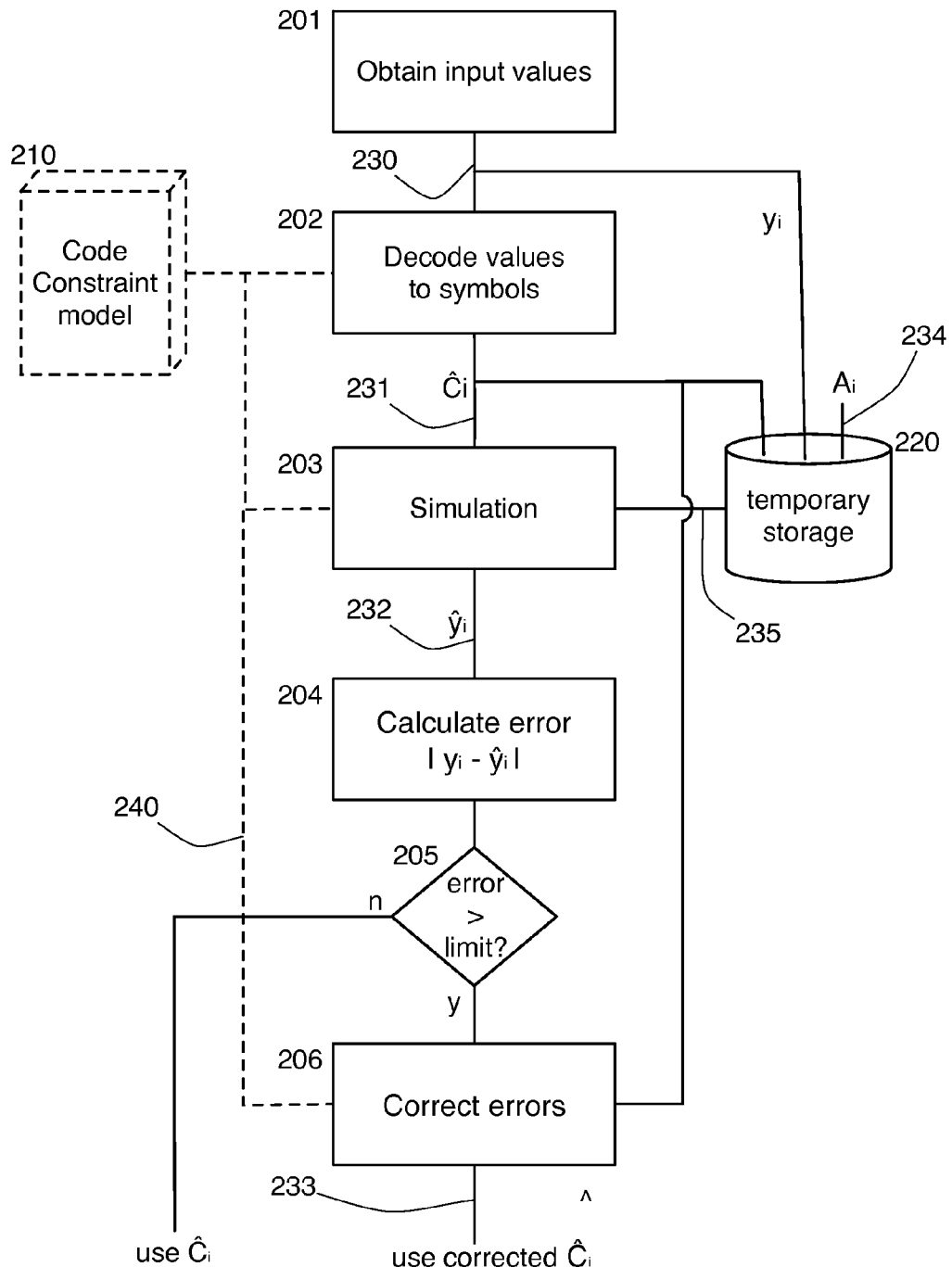
FIG. 2 shows a flow chart of the predictive decoder and error correction elements in accordance with at least one embodiment of the invention.

FIG. 2 shows a flow chart of the predictive decoder and error correction elements in accordance with at least one embodiment of the invention. Input values 230 are obtained at 201 and decoded at 202 to produce tentative symbol selections 231. Simulation 203 acts on the tentative symbol selections to produce simulated input values 232. Simulated values 232 are compared 204 to the actual input values 230, with the absolute value of the difference 232 tested against an error limit 205. If the magnitude of the difference is greater than the error limit, error correction operation 206 produces corrected symbols 233 for use. Conversely, if no significant errors are detected, the tentative symbol selection 231 is considered definitive, and the corrected symbols are identical to the tentative symbol selection.

A historical record of input values 230, tentative symbol selections 231, and channel matrices 234 are temporally stored 220 for use 235 by simulation 203. The above examples describe information concerning the current and two preceding symbol clock intervals being stored and used by the method, although that time window of correction is arbitrary, chosen for purposes of description and without implying a limitation.

The set of constraints 210 that define the vector signaling code in use are inherent elements of decoding 202, simulation 203, and error correction 206 operations, thus are shown as being associated with those operations as indicated by the dotted line 240.

Eye Diagrams as a Metric of Receive Detection Margin

Conventional single channel serial communications systems rely on eye diagrams to show relative receive margins and thus set expectations as to achievable error rate. These diagrams are simply statistical plots that are a superposition of all possible signal transitions, providing a visual representation of the signal levels and timing windows available to the signal detector. An "open eye" implies that there is sufficient amplitude differential to permit a slicing detector to distinguish between, as examples, one and zero, and sufficient clock stability to obtain an unambiguous sampling window within a single signal time interval. Conversely, when the "eye closes", certain signal transitions may be seen to intersect the available slicing/sampling window, indicating risk of bit errors from the signal detector because of insufficient signal amplitude distinction or excessive timing jitter.

There is generally no equivalent single metric for overall signal quality in vector signaling code communications systems. As has been shown, signal levels of individual channels of the vector signaling group may not have a direct relationship to overall codeword decode accuracy, especially when adaptive or predictive feedback detection methods are used.

Correctable Error Rate as a Quality Metric

In at least one embodiment in accordance with the invention, a continuously-measured correctable error rate such as output from error calculation 204 of FIG. 2 may be incorporated into a generalized quality metric for the aggregate vector signaling channel. This value varies from near zero under ideal receive conditions to a threshold value where error correction is introduced (a first range of results,) and then continues to increase as receive conditions degrade, with greater numbers of wire values being flagged as requiring error correction (a second range of results,) until the limit of correctable errors is reached.

One such embodiment non-linearly scales the error calculation result before display as a quality metric, either by use of a non-linear scaling function such as an exponential, or by use of a piecewise approximation such as use of one multiplicative factor for the first range of results, and a second multiplicative factor for the second range of results. Another such embodiment displays the scaled error calculation results using one indicator for the first range of results such as a range of colors from green to yellow, and a second indicator for the second range of results such as a range of colors from yellow to red.

Dynamic Estimation of Error Probability

As was previously shown, analysis of the difference between actual received data and simulations of received data may be used to inform both error detection and error correction operations. A similar analysis may be made to estimate the error rate itself, to be used either in further adaptation of the receive process or as a displayable quality metric.

In accordance with at least one embodiment of the invention, a vector signaling code us transmitted over a set of N wires, where the transmission codebook is comprised of M codewords C1, C2, . . . . CM where each codeword has N elements. A decoder receiving inputs yin (where i=1 to M and n=1 to N) consists, as an example, of a set of P comparators $Cmp_p(y,t)$, $p=1, \ldots P$, with each comparator computing a specific function of its input values, the function determined by the decoding strategy being used for the chosen coding scheme. Such functions can take the form of weighted sums of input terms. The weights may be integer values with each comparator receiving the same inputs with different weights and producing an output corresponding to the sign of the sum of its weighted inputs, the set of comparator outputs uniquely identifying each codeword of the vector signaling code. In some embodiments, the function computed by the comparators is nonlinear.

If t is the sampling phase of the comparator, the codeword Ci is decoded correctly if and only if the received line data yi corresponding to the codeword Ci produces comparator outputs that satisfy $$Cmp_p(y_i, t_p) > \alpha_p \; p = 1, \ldots P \qquad \text{[Eqn. 5]}$$

where $t_p$ and $\alpha_p$ are the sampling phase and the slicing threshold of the comparator p, respectively.

To find the statistical eye for comparator p, the probability of error for comparator p as the average of the error probabilities over the codewords may be written as $$P(\text{error } Cmp_p) = \text{sum}\{i=1:M\} P(\text{error } Cmp_p|C_i) P(C_i) \quad [\text{Eqn. 6}]$$

where $$P(\text{error } Cmp_p|C_i) P(C_i) = P(Cmp_p(y_i, t_p) <= \alpha_p|C_i) \quad [\text{Eqn. 7}]$$

An upper bound on the total probability of error given the code Ci has been sent, i.e., P(decoding error|Ci) may be derived using union bound:

$$P(\text{decoding errors}|C_i) = P(U\{p=1,\ldots,P\} Cmp_p(y_i, t_p)$$
$$<= \alpha_p|C_i) <= [\text{sum}\{p=1,\ldots,P\} \quad [\text{Eqn. 8}]$$

$$P(Cmp_p(y_i, t_p) <= \alpha_p|C_i)] \quad [\text{Eqn. 9}]$$

Similarly, a lower bound on the total probability of error can be written as $$[\max\{p=1,\ldots,P\} P(Cmp_p(y_i, t_p) <= \alpha_p|C_i)] <= P(\text{decoding errors}|C_i) \quad [\text{Eqn. 10}]$$

Therefore, the total probability of error can be lower and upper bounded as:

$$P(\text{decoding error}) <= \text{sum}\{i=1:M\}[\text{sum}\{p=1,\ldots,P\} P$$
$$(Cmp_p(y_i, t_p) <= \alpha_p|C_i)] P(C_i) \quad [\text{Eqn. 11}]$$

$$P(\text{decoding error}) >= \text{sum}\{i=1:M\}[\max\{p=1,\ldots,P\} P(Cmp_p(y_i, t_p) <= \alpha_p|C_i)] P(C_i) \quad [\text{Eqn. 12}]$$

Figure 3:
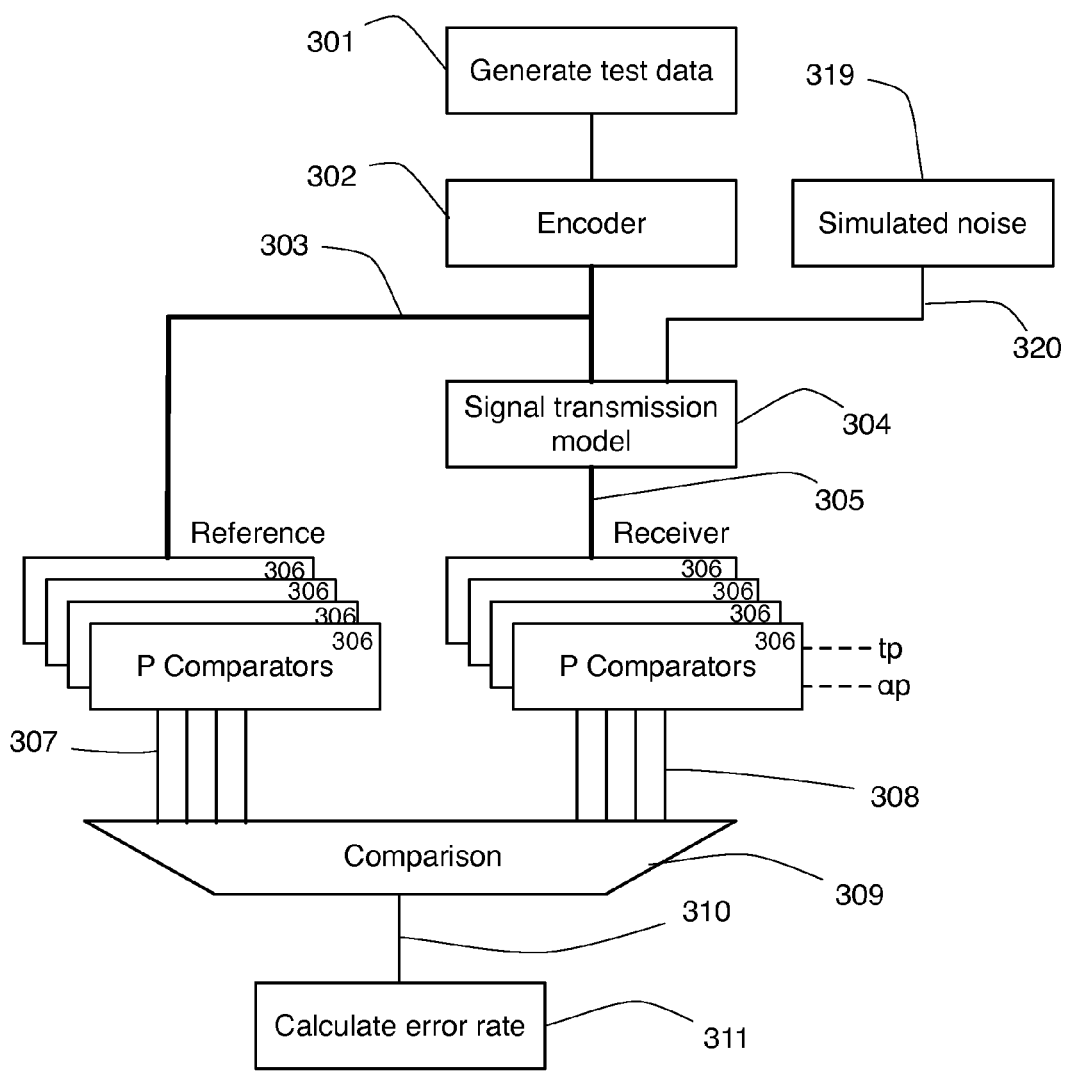
FIG. 3 is a block diagram illustrating dynamic computation of error rate in a simulation environment, in accordance with at least one embodiment of the invention.

It is noted that the upper and lower bounds are significantly easier to compute dynamically than the exact error value. Furthermore, it is observed that in the typical case of small to moderate error rates, the calculated upper and lower bounds may be quite close, allowing for simple estimation of the total probability of error for each value of the sampling phase tp and the slicing threshold αp In accordance with at least one embodiment of the invention, FIG. 3 provides a block diagram illustrating an example of this method being applied in a simulation environment. In such an environment, a synthetic source of test data 301 is used to create a stream representing all possible sequences of data; as one example, the stream may be generated using a pseudo-random number generator. The test data is encoded 302, producing a series of vector signaling codewords 303 as input to the signal transmission model 304, which outputs simulated receive signals 305 which may include signal path distortions including attenuation, skew, and simulated crosstalk, as well as noise 320 produced by noise source simulator 319.

Comparators 306 are used as described above to detect codewords of the vector signaling code. Two sets of comparators are used, one set of P comparators acting upon undistorted inputs 303 to produce reference results 307, the other set of P comparators acting upon the simulated receive signals 305, to provide receiver results 308. Comparison 309 identifies discrepancies 310 between reference and receiver results, driving the calculation of error rate 311.

Figure 4:
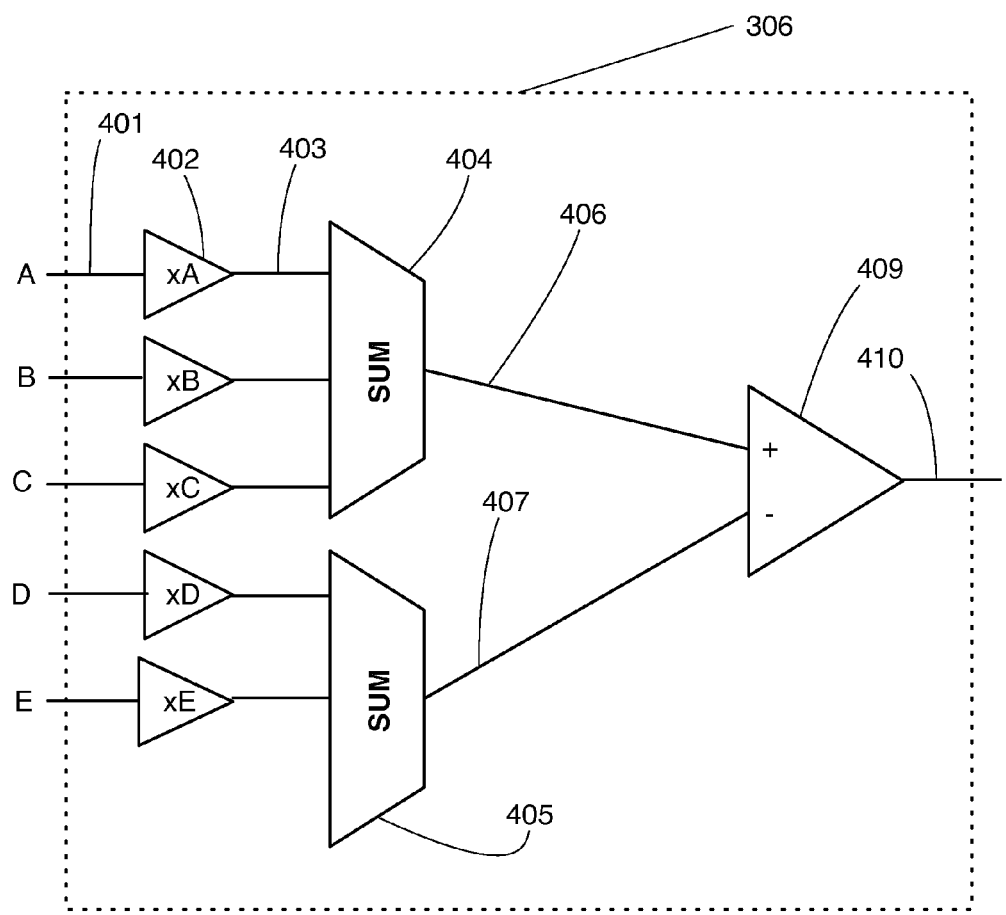
FIG. 4 details one embodiment of a comparator such as shown in FIG. 3 in accordance with the invention.

FIG. 4 details the functional behavior of one of the comparators (e.g. any of 306) of FIG. 3. In accordance with at least one embodiment of the invention, it has multiple inputs 401; five are shown as an example, labeled A through E, and a single digital output 410. Each input 401 is associated with a weighting factor, here illustrated as discrete amplifiers 402 having gains xA, xB . . . xE, producing weighted inputs 403 which are summed. Again, as an example the summing nodes 404 and 405 are shown as discrete analog adders producing summed outputs 406 and 407, with 406 representing the sum of all inputs having positive weighting factors, and 407 representing the sum of all inputs having negative weighting factors. Differential comparator 409 compares 406 and 407, producing digital output 410.

In accordance with at least one embodiment of the invention, weighting elements 402 and summing elements 404 are combined into a single functional circuit. In at least one such embodiment, resistive or capacitive ratios of circuit elements are used at least in part to perform the necessary weighting and summing operations. In at least one such embodiment, the necessary operations are performed at least in part by proportionate current flows through scaled active circuit elements such as transistor channels. In at least one such embodiment, the necessary operations are performed at least in part by proportionate charges stored in capacitive elements and transferred to other capacitive elements. In at least one such embodiment, all scaled inputs are summed to a single input of the comparator, and the second input to the comparator is held at a reference level.

Other means of decoding a vector signaling code are known, and are equally applicable to the present invention. In accordance with at least one embodiment of the invention, at least one bounding equation for the error rate of the other decoding means may be found which is easier or faster to compute than the actual error rate of the decoding means.

In accordance with at least one embodiment of the invention, the described methods are performed by software executing in a general purpose computer, the described operations being performed by numerical or symbolic computation. In at least one embodiment of the invention, the method is performed by a stored program, hardware state machine, or sequencer in a Digital Signal Processor. In at least one embodiment of the invention, the method is performed by dedicated digital logic circuits. In a further embodiment of the invention, at least a portion of the method is performed using a dedicated analog circuit.

The examples illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. As used herein, the term "signal" includes any suitable behavior and/or attribute of a physical phenomenon capable of conveying information that is tangible and non-transitory.

Interpreting a set of signals as selecting an object (e.g., a data object) can include selecting the object based at least in part on the set of signals and/or one or more attributes of the set of signals. Interpreting a set of signals as representing an object (e.g., a data object) can include determining and/or selecting the object based at least in part on a representation corresponding to the set of signals. A same set of signals may be used to select and/or determine multiple distinct objects (e.g., data objects).

I claim:

1. A method comprising:
   receiving a set of Inter-Symbol Interference (ISI) distorted signals from a multiwire communications bus;
   generating a valid codeword comprising a set of predicted symbols of a balanced vector signaling code based on the received set of ISI distorted signals;
   generating a set of simulated signals based on the set of predicted symbols, input channel measurements, and a set of historical symbols, the historical symbols corresponding to decisions made in past time intervals;

generating a set of symbol error correction terms based on a difference between the set of simulated signals and the set of ISI-distorted signals;

generating a set of symbols of a corrected codeword based on the valid codeword and the set of symbol error correction terms; and, outputting the corrected codeword.

2. The method of claim 1, further comprising temporarily storing at least the received Inter-Symbol Interference distorted signals and the valid codeword to produce at least a historical received Inter-Symbol Interference distorted signals and a historical valid codeword.

3. The method of claim 1 wherein at least one of the symbols of the valid codeword and the symbols of the corrected codeword are used by the receiving step for the next received Inter-Symbol Inteference distorted signals.

4. The method of claim 1, wherein the set of symbol error correction terms are additionally output as receive quality metrics.

5. The method of claim 1, wherein the balanced vector signaling code is at least a ternary code.

6. A system comprising:
a plurality of receivers, each receiver associated with a respective wire of a multiwire communications bus, the plurality of receivers configured to receive a set of Inter-Symbol Interference distorted signals;
a decoder configured to accept the received set of Inter-Symbol distorted signals and generate a set of predicted symbols of a valid codeword of a balanced vector signaling code; and,
a simulator acting upon the predicted symbols, input channel measurements, and a set of historical symbols configured to synthesize a set of simulated signals, wherein the set of historical symbols correspond to decisions made in past time intervals, generate a set of symbol error correction terms by representing a difference between the set of simulated signals and the received ISI distorted signals, correct errors by modification of the predicted symbols of the valid codeword to produce a corrected codeword of the balanced vector signaling code, and interpret the corrected codeword to obtain the received ISI distorted signals.

7. The system of claim 6, further comprising temporary storage of at least the received Inter-Symbol Interference distorted signals and the predicted symbols of the valid codeword to produce at least a historical received Inter-Symbol Interference distorted signals and a historical valid codeword.

8. The system of claim 6 wherein at least one of the predicted symbols of the valid codeword and the symbols of the corrected codeword are used by the receiver to obtain the next received Inter-Symbol Interference distorted signals.

9. The system of claim 6, wherein the set of symbol error correction terms are output as receive quality metrics.

10. The system of claim 6, wherein the balanced vector signaling code is at least a ternary code.

* * * * *